US011216014B1

(12) United States Patent
Mishra et al.

(10) Patent No.: US 11,216,014 B1
(45) Date of Patent: Jan. 4, 2022

(54) COMBINED SEMANTIC CONFIGURATION SPACES

(71) Applicant: Amazon Technologies, Inc., Seattle, WA (US)

(72) Inventors: Pragyana Mishra, Seattle, WA (US); Javier Alonso Lopez, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 16/528,922

(22) Filed: Aug. 1, 2019

(51) Int. Cl.
| | |
|---|---|
| G05D 1/00 | (2006.01) |
| G06T 17/20 | (2006.01) |
| B64C 39/02 | (2006.01) |
| G06K 9/00 | (2006.01) |
| G05D 1/10 | (2006.01) |
| G05D 1/08 | (2006.01) |

(52) U.S. Cl.
CPC ........... G05D 1/102 (2013.01); B64C 39/024 (2013.01); G05D 1/0088 (2013.01); G05D 1/0858 (2013.01); G06K 9/0063 (2013.01); G06T 17/20 (2013.01); B64C 2201/12 (2013.01)

(58) Field of Classification Search
CPC .... G05D 1/102; G05D 1/0858; G05D 1/0088; G05D 1/00; B64C 39/024; B64C 2201/12; B64C 39/02; G06T 17/20; G06T 17/00; G06K 9/0063; G06K 9/00
See application file for complete search history.

(56) References Cited

U.S. PATENT DOCUMENTS

| | | | | |
|---|---|---|---|---|
| 11,077,554 | B2* | 8/2021 | Arase | B25J 9/1687 |
| 11,087,160 | B2* | 8/2021 | Martin, Jr. | G06Q 10/087 |
| 11,094,146 | B1* | 8/2021 | Mash | G08G 5/0069 |
| 2019/0026917 | A1* | 1/2019 | Liao | G06N 3/0454 |
| 2019/0143504 | A1* | 5/2019 | Kimoto | B25J 9/1607 |
| | | | | 700/245 |
| 2019/0193956 | A1* | 6/2019 | Morland | B65G 61/00 |
| 2020/0211385 | A1* | 7/2020 | Johnson | G06Q 50/30 |
| 2021/0009365 | A1* | 1/2021 | Ganesh | G05D 1/02 |
| 2021/0125343 | A1* | 4/2021 | Yang | G06T 7/246 |
| 2021/0129334 | A1* | 5/2021 | Kanunikov | B25J 9/1671 |

* cited by examiner

Primary Examiner — Yonel Beaulieu
(74) Attorney, Agent, or Firm — Athorus, PLLC

(57) ABSTRACT

Disclosed are systems and methods that generate individual semantic layers for different object types within an environment. For each object type semantic layer and for an aerial vehicle, a semantic configuration space may be formed that indicates all valid aerial vehicle configurations in which the aerial vehicle does not collide with objects of the object type that exists in the environment. Finally, a combined configuration space may be formed by overlaying multiple semantic configuration spaces for object types known to be within the environment. The resulting combined configuration space indicates a common area in which the aerial vehicle can navigate according to the configuration of the common area and not collide with any objects of the object types represented by the combined semantic configuration spaces.

20 Claims, 10 Drawing Sheets

COMBINED SEMANTIC CONFIGURATION SPACES

BACKGROUND

Unmanned Aerial Systems (UAS) need a minimum space that is clear and accessible for landing and/or takeoff and a clear space to navigate between different locations. In unfamiliar areas, delineating these spaces requires a mapping method that either uses 2D imagery, 3D models, or a combination of both to ascertain potential locations that are clear of objects and in which the UAS can operate. These techniques, which often use three-dimensional point-clouds or mesh models, are computationally expensive and data intensive. Plus, valuable flight time may be consumed by the UAS as it images an area and processes those images in search for a clear and accessible area to land.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
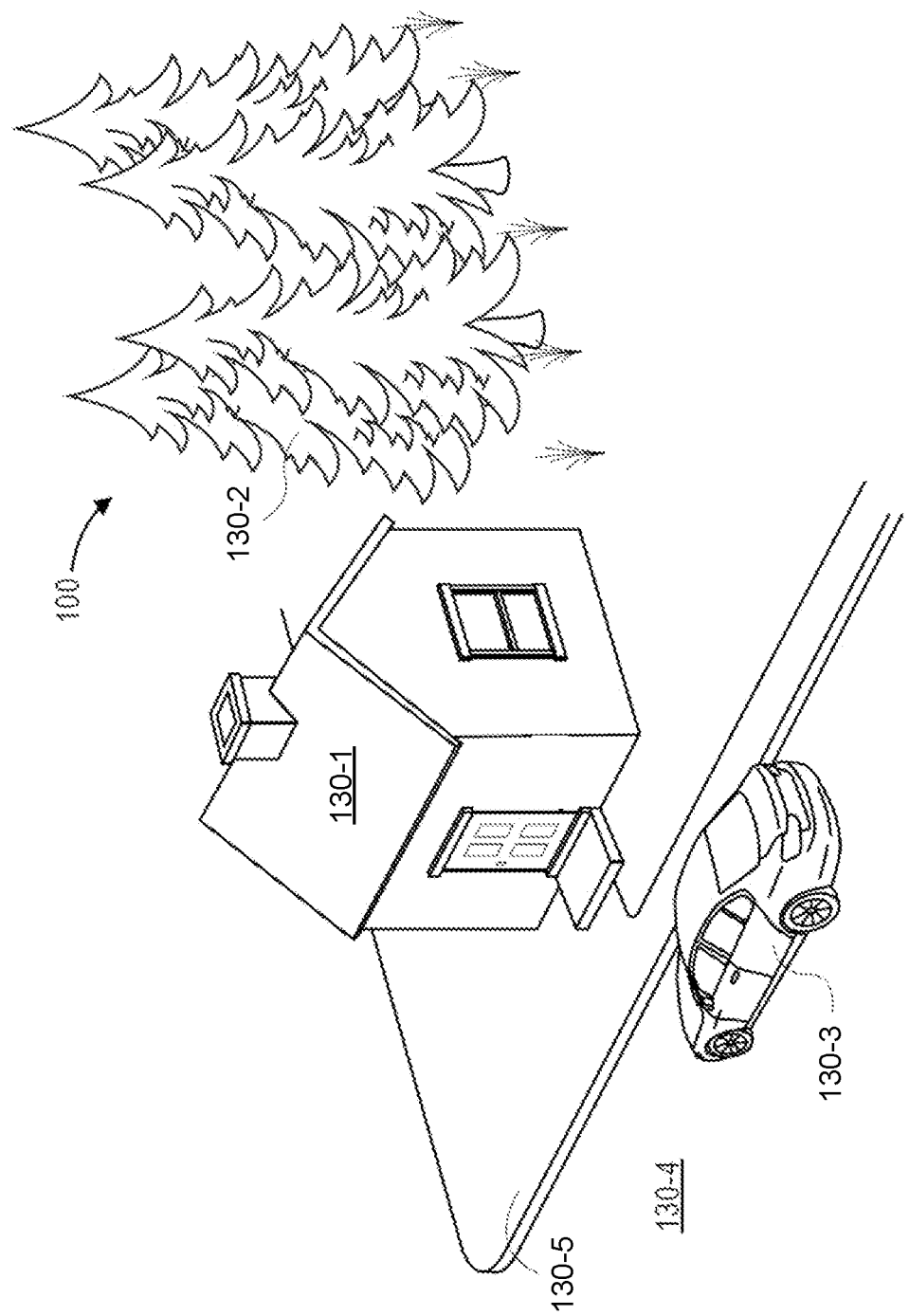
FIG. 1 is a schematic diagram of example environment in which an aerial vehicle may operate, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims.

DETAILED DESCRIPTION

Systems and methods to determine common areas between a source location and a destination location in which an aerial vehicle, such as a UAS, can operate without colliding with another object, are disclosed. In some implementations, publicly available maps, such as two-dimensional ("2D") parcel maps, three-dimensional ("3D") building maps, cell phone and antenna tower maps, road, bridge, and freeway maps, topology maps, terrain maps, etc., may be obtained and processed to generate 3D vector maps of objects within an environment. In addition, image data from aerial vehicles, satellites, etc., may also be processed and used to generate 3D vector maps of objects within the environment. The vector maps may then be used to generate, for each different object type, a respective semantic layer that includes 3D bounding shapes corresponding to the size, position, and shape of objects of that object type. For example, there may be a different semantic layer for each different object type, such as buildings, trees, antenna towers, power lines, bridges, roads, mountains, etc. In each semantic layer, 3D bounding shapes, in vector form, are included as representative of the position, size, and shape of each known object. As discussed further below, the semantic layers may be validated and/or updated based on actual aerial navigation through the environment and detection of the presence or absence of objects within the environment during the aerial navigation.

In some implementations, in addition to semantic layers being generated for physical objects, semantic layers may also be generated for navigation barriers or areas in which the aerial vehicle is not to operate, such as no-fly zones around airports, hospitals, schools, etc. Likewise, in some implementations, semantic layers may be generated for minimum and/or maximum altitudes at which the aerial vehicle is to operate during transit through the environment. In each instance, regardless of the obstacle, barrier, etc., a semantic layer may be generated that indicates the obstacle, barrier, object, etc., as a 3D bounding shape that the aerial vehicle is to avoid. For example, the no-fly zone of an airport may be represented as a 3D bounding shape around the airport having a size and shape, dictated by the size and shape of the no-fly zone.

Each of the semantic layers may be independently processed to generate a semantic configuration space ("c-space") for the object type represented by the semantic layer. The semantic c-space for each semantic layer indicates all valid configurations of an aerial vehicle, determined based at least in part on parameters of the aerial vehicle, in which the aerial vehicle does not collide with one or more of the objects of the object type corresponding to the semantic layer used to generate the semantic c-space. For example, aerial vehicle parameters for an aerial vehicle that will operate in the environment may be specified and used in conjunction with the semantic layer to generate a semantic c-space for that object type and that aerial vehicle. For example, if the vehicle can operate in k dimensions of freedom: $u_1, u_2, u_3, \ldots, u_k$, the k values form a single point in the k-dimensional space called the c-space of the vehicle. For example, if an aerial vehicle can operate with six degrees of freedom—heave (moving up and down along the Z axis), surge (moving forward and backward along the Y axis), sway (moving left and right along the X axis), pitch (rotating about the X axis), roll (rotating about the Y axis), and yaw (rotating about the Z axis)—k is 6. Each point in the aerial vehicles c-space represents a valid configuration of the aerial vehicle—a set of six values that represent the vehicle's position and orientation in space. In some implementations, not all potential configurations may be possible and those may be removed from the vehicles c-space. For example, the aerial vehicle may have limits to which it can safely pitch, roll, yaw, heave, sway, surge, and/or combination thereof, which may be specified in the vehicle parameters, and points beyond those limits may be excluded from the vehicles c-space.

While the above example describes an aerial vehicle that can operate in six degrees of freedom, the disclosed implementations are equally applicable to vehicles that can operate with fewer or greater degrees of freedom. For example, some aerial vehicles may be reconfigurable (e.g., the aerial vehicle may be able to extend or retract wings or propulsion mechanisms) and may be able to operate with greater than six degrees of freedom. In other examples, if the vehicle is ground based it may operate in less then six degrees of freedom.

Applying the vehicle's c-space to a semantic layer, a semantic c-space is formed that specifies for each configuration (position and orientation) of the vehicle in the semantic c-space whether the vehicle will collide with an object of the object type represented by the semantic layer. Because the semantic layers represent objects of the different object types as 3D bounding shapes and the vehicle properties of a vehicle are known, a semantic c-space for each of the different object types can be pre-computed (e.g., before actual navigation) for the environment and maintained in a data store.

Prior to navigation by the vehicle between a source location and a destination location, different objects present between the two locations are determined and the semantic c-spaces for those objects are superimposed or combined to form a combined c-space. The combined c-space indicates a common area and configuration in which the vehicle can operate without colliding with any of the objects of the different object types represented by the different semantic c-spaces that are combined.

Combining different semantic c-spaces is a computationally light-weight process that can be done in real-time or near real time. In addition, if it is determined that an object or group of objects of an object type have changed (e.g., a new building is erected, a new antenna tower erected, a new crane, etc.), the semantic layer for that object type and the semantic c-space from that semantic layer are the only updates that are needed. The updated semantic c-space may then be overlaid with the other semantic c-spaces for object types that are unchanged, and an updated combined c-space quickly generated.

Navigation route planning using semantic c-spaces for different object types that can be overlaid or combined to form a combined c-space provides a technical improvement over existing systems because it only requires point lookups within a common area defined by the combined c-space to plan a navigation route. There is no need for segmentation, classification, or recognition of objects in the environment by the vehicle using 3D point clouds or a sequence of 2D images. In addition, if changes to objects are determined within the environment, the corresponding semantic layer for that object type and resulting semantic c-space are the only portions that need to be updated, rather than having to re-compute the entire environment.

FIG. 1 is a schematic diagram of example environment 100 in which an aerial vehicle may operate, in accordance with disclosed implementations.

As illustrated, an environment 100 may include any number of a variety of objects 130. In the illustrated example, objects may include, but are not limited to a structure 130-1, such as a house, building, shed, etc., plants 130-2, an automobile 130-3, a street 130-4, a sidewalk 130-5, etc. As will be appreciated, an environment may include any number, type, size, and/or position of objects. Likewise, objects, as discussed herein, may be stationary, such as the structure 130-1, mobile, such as the automobile 130-3, or stationary but changing (e.g., growing), such as the trees 130-2. Any type of object, including fixed, static, mobile, natural, manmade, artificial, temporary, permanent, or other types of objects, obstacles, or structures, may be represented by a semantic layer, in accordance with the disclosed implementations. Likewise, in some implementations, objects, as used herein, may not be limited to physical objects. For example, an object may be a restricted air-space, a minimum altitude, a maximum altitude, an area in which navigation is not preferred or prohibited (e.g., over a school, park, power plant, airport, etc.).

Object information, such as the geographic location, position, size, shape, orientation, object type, etc., may often be obtained from publicly accessible information, such as two-dimensional ("2D") parcel maps, three-dimensional ("3D") building maps, cell phone and antenna tower maps, road, bridge, freeway maps, topology maps, terrain maps, etc. Such information may be used alone or in combination with object information obtained from other sources, such as satellite images, images obtained from other vehicles (ground, aerial), etc., to generate semantic layers for each of the different object types. Each semantic layer may be specific to an object type and each object of the object type represented in the semantic layer as a 3D bounding shape corresponding to the size, position, and shape of the object. In some implementations, the 3D bounding shape of each object may include an extra buffer or increase (e.g., two-percent increase) in the overall size or shape of each represented object of the object type.

Figure 2C:
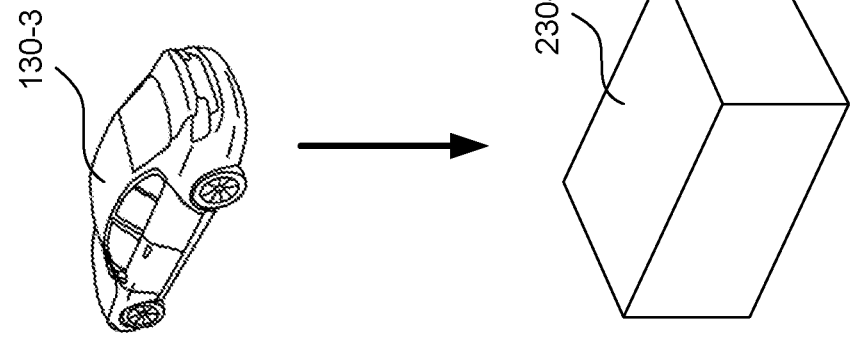
FIG. 2C is a schematic diagram of a three-dimensional bounding shape for an automobile object type, in accordance with disclosed implementations.
Figure 2B:
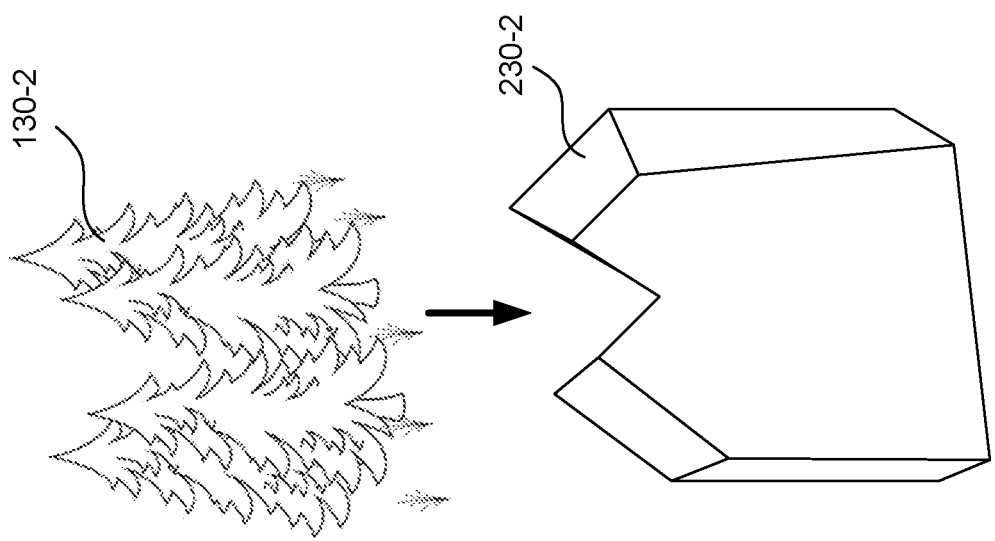
FIG. 2B is a schematic diagram of a three-dimensional bounding shape for a plant object type, in accordance with disclosed implementations.
Figure 2A:
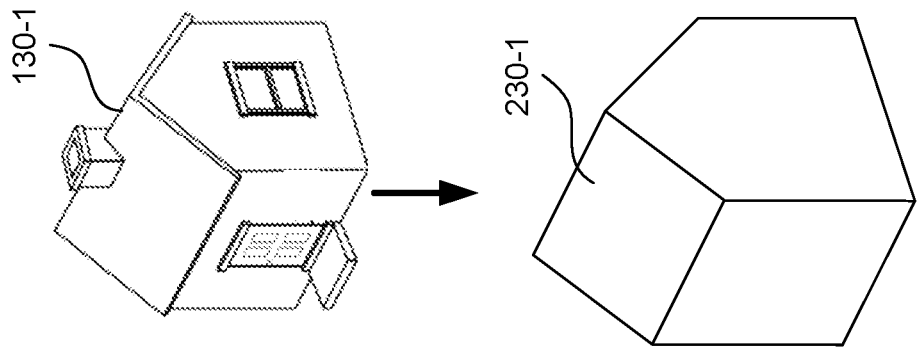
FIG. 2A is a schematic diagram of a three-dimensional bounding shape for a structure object type, in accordance with disclosed implementations.

FIG. 2A is a schematic diagram of a three-dimensional bounding shape 230-1 for a structure object type 130-1, in accordance with disclosed implementations. As illustrated, based on data known or available about the structure 130-1, a 3D bounding shape is generated that corresponds to the size, shape, orientation, and position of the structure 130-1. The 3D bounding shape 230-1 may be represented in the structure sematic layer as a set of vectors representative of the structure. The structure semantic layer for structure object types may include 3D bounding shapes for all structures (e.g., homes, sheds, apartment buildings, shopping malls, hospitals, stadiums, etc.). In other implementations, different semantic layers may be established for different types of structures. For example, a semantic layer may be generated for residential structures, another semantic layer generated for business structures, another semantic layer generated for government structures, etc.

FIG. 2B is a schematic diagram of a three-dimensional bounding shape 230-2 for a plant object type 130-2, in accordance with disclosed implementations. Similar to the structure 3D bounding shape 230-1, the plant 3D bounding shape 230-2 is generated that corresponds to the size, shape, orientation, and position of plants 130-2 within the environment. The 3D bounding shape may be represented in the plant sematic layer as a set of vectors representative of the plant. The plant semantic layer for plant object types may include 3D bounding shapes for all types of plants (e.g., bushes, trees, shrubs, flowers, crops, etc.). In other implementations, different semantic layers may be established for different types of plants and/or different sizes of plants. For example, a semantic layer may be generated for agriculture plants or corps (e.g., corn, grapes, barley), another semantic layer generated for trees, another semantic layer generated for bushes, etc.

FIG. 2C is a schematic diagram of a three-dimensional bounding shape 230-3 for an automobile object type 130-3, in accordance with disclosed implementations. Similar to the structure 3D bounding shape 230-1, the automobile 3D bounding shape 230-3 is generated that corresponds to the size, shape, orientation, and position of automobiles 130-3 within the environment. The 3D bounding shape may be represented in the automobile sematic layer as a set of vectors representative of the automobile. The automobile semantic layer for automobile object types may include 3D bounding shapes for all types of automobiles (e.g., cars, trucks, motorcycles, busses, etc.). In other implementations, different semantic layers may be established for different types of automobiles. For example, a semantic layer may be generated for cars, another semantic layer generated for trucks, another semantic layer generated for busses, etc.

Any number of semantic layers may be created for any type or variety of object types. Likewise, as noted above, not all objects need be physical in nature. For example, a semantic layer may be generated as representative of no-fly zones within an environment, minimum altitude and/or maximum altitude for transit within the environment, or any other barrier or restriction as to the route a vehicle may take as it navigates through the environment.

Figure 3:
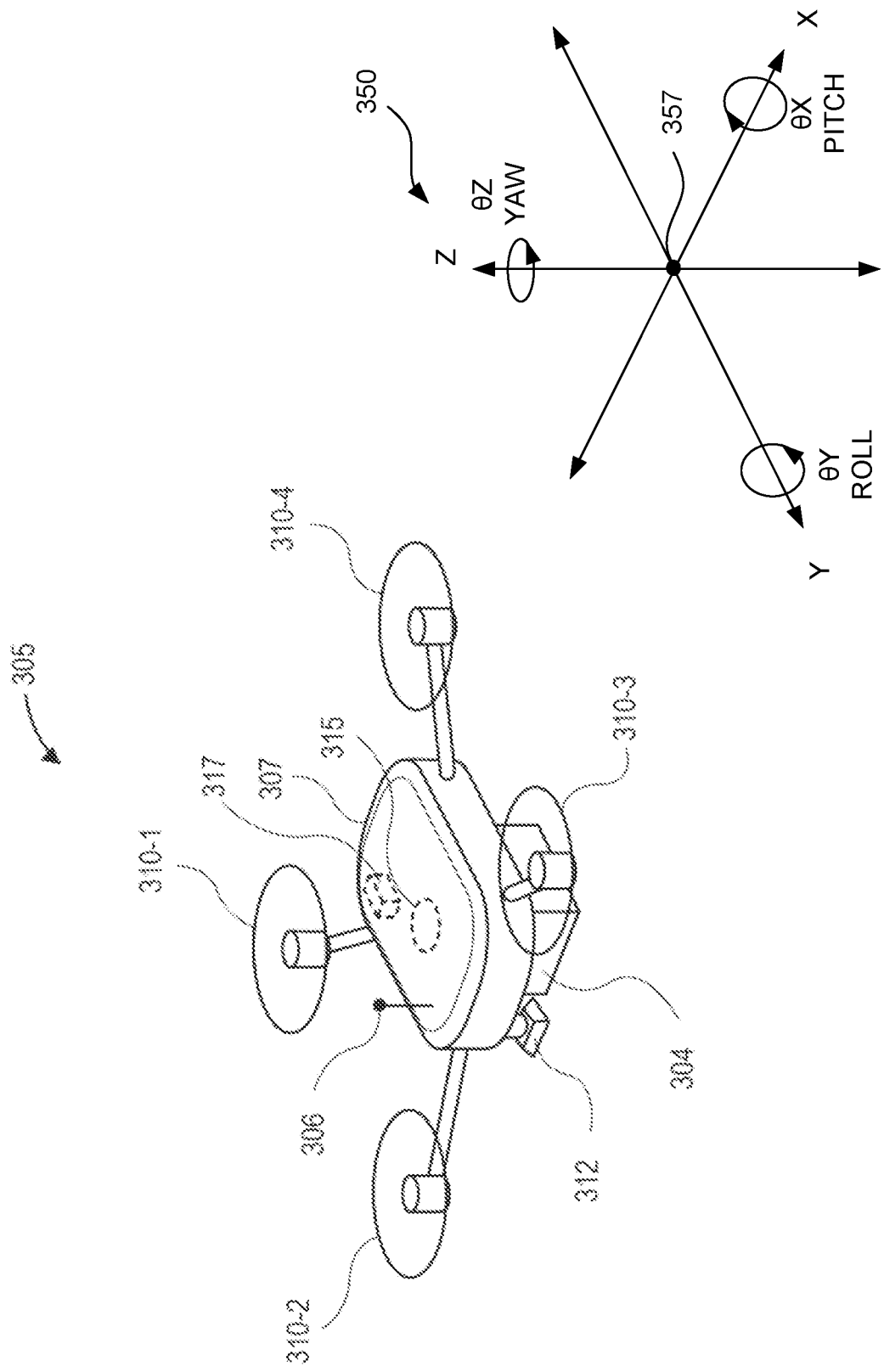
FIG. 3 is an example aerial vehicle, in accordance with described implementations.

FIG. 3 is an example aerial vehicle 305, in accordance with described implementations.

As illustrated in FIG. 3, an aerial vehicle 305 may include a frame or body 307, and a plurality of propulsion mechanisms, such as motors and propellers 310, coupled to the frame or body 307. The frame or body 307 may be formed of any suitable materials, such as carbon fiber, metals, plastics, or combinations thereof. In addition, the motors and propellers 310 may be coupled to the frame or body 307, or via one or more motor arms extending from the frame or body 307. The motors may be any suitable motors for rotating respective propellers 310 to generate thrust to lift or maneuver at least a portion of the aerial vehicle 305. The propellers 310 may be formed of any suitable materials, such as carbon fiber, metals, plastics, or combinations thereof. Further, the aerial vehicle 305 may also include a control system 315 that may control operation and navigation of the aerial vehicle 305, including aspects related to operation of the motors and propellers 310.

Although FIG. 3 shows an aerial vehicle having a particular shape, size, number of motors and propellers 310-1, 310-2, 310-3, 310-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In addition, the aerial vehicle 305 may include an analysis unit 317 that includes one or more processors that may process or analyze sensor data to detect objects within an environment as the aerial vehicle 305 is operating. The analysis unit 317 may be included as part of the control system 315 or independent of the control system 315.

The aerial vehicle 305 may also include an antenna 306 or other wireless transmission mechanism to enable wireless communication between the aerial vehicle and other computing sources, such as computing sources that provide navigation routes, combined c-spaces, common areas determined from a combined c-space, delivery information, source locations and/or destination locations, etc. Likewise, the aerial vehicle 305 includes one or more sensors 312, such as a camera, ranging sensor, altimeter, barometer, etc., that may be used by the control system 315 and/or the analysis unit 317 to navigate the aerial vehicle 305 and/or to obtain sensor data representative of detected objects. For example, the sensor 312 may be a digital Red, Green, Blue (RGB) camera oriented to obtain images of objects around the aerial vehicle 305 when the aerial vehicle is airborne.

The aerial vehicle 305 may also include a payload engagement component 304 that is operable to engage, carry, and/or disengage a payload, such as an item, for aerial transport by the aerial vehicle 305.

As discussed, and as illustrated by the 3D Cartesian coordinate system 350, the aerial vehicle 305, which in this example operates in six degrees of freedom X, Y, Z, OX, OY, OZ may be represented as a single point 357. In generating each semantic c-space for each of the different object types, as discussed herein, each point within the c-space represents a valid configuration of the aerial vehicle—a set of six values that represent the vehicle's position and orientation in space. In some implementations, not all potential value combinations may be possible and those may be removed from the vehicles c-space. For example, the aerial vehicle may have limits to which it can safely pitch, roll, yaw, heave, sway, surge, and/or combination thereof, which may be specified in the vehicle parameters, and points beyond those limits may be excluded from the vehicles c-space. Likewise, in other examples, the aerial vehicle may have fewer or greater number of degrees of freedom. For example, if the aerial vehicle can extend or retract wings, it may operate with more than six degrees of freedom.

While the examples discussed herein describe implementations with respect to aerial vehicles, it will be appreciated that the disclosed implementations may also be applied to other forms of vehicles. For example, the disclosed implementations may be used with aerial vehicles, unmanned aerial vehicles, ground based vehicles, unmanned ground based vehicles, water based vehicles, unmanned water based vehicles, amphibious vehicles, and/or unmanned amphibious vehicles. As will be appreciated, different vehicles and/or different types of vehicles may operate with different degrees of freedom.

Figure 4:
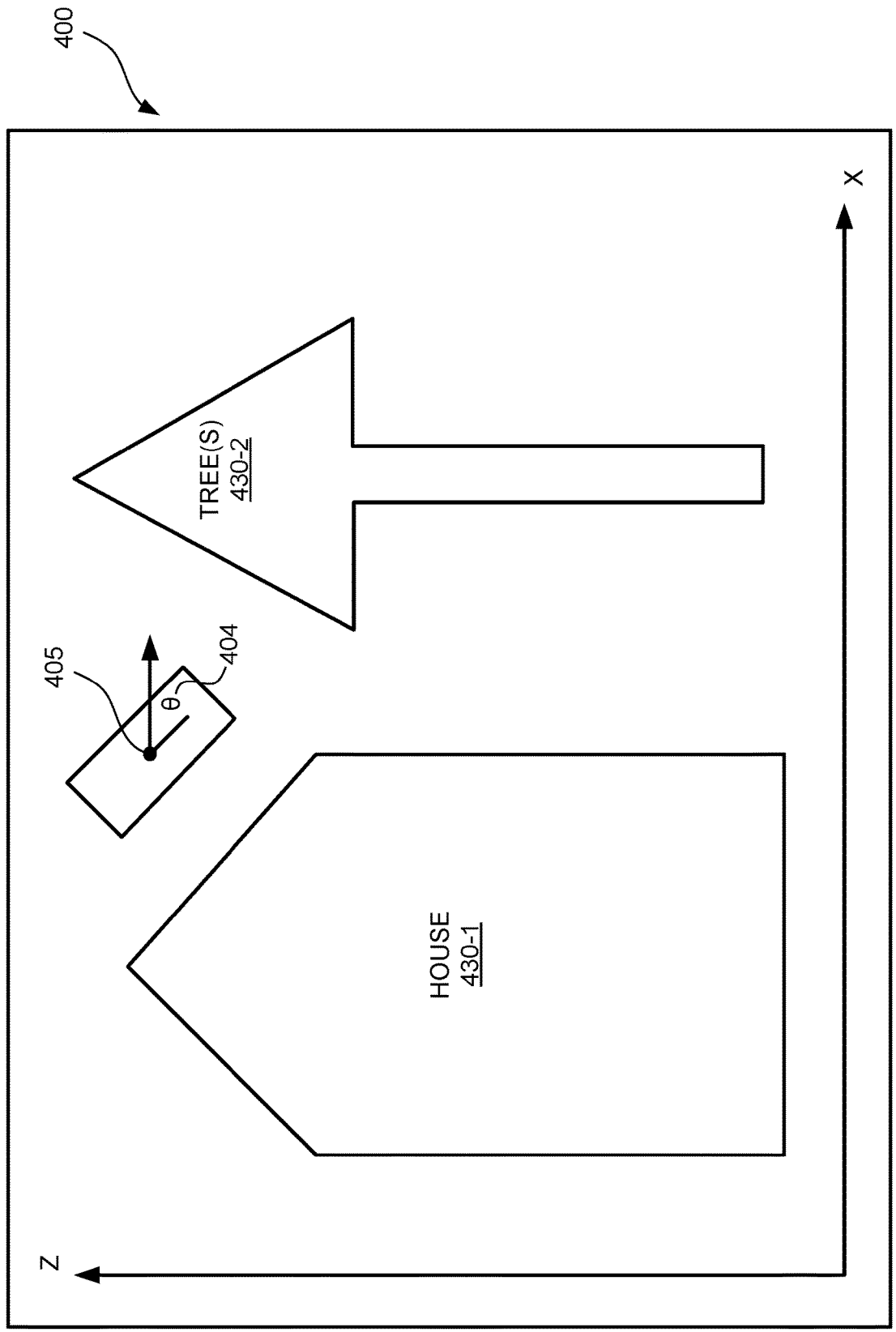
FIG. 4 is a schematic diagram of a two-dimensional workspace, in accordance with described implementations.
Figure 5:
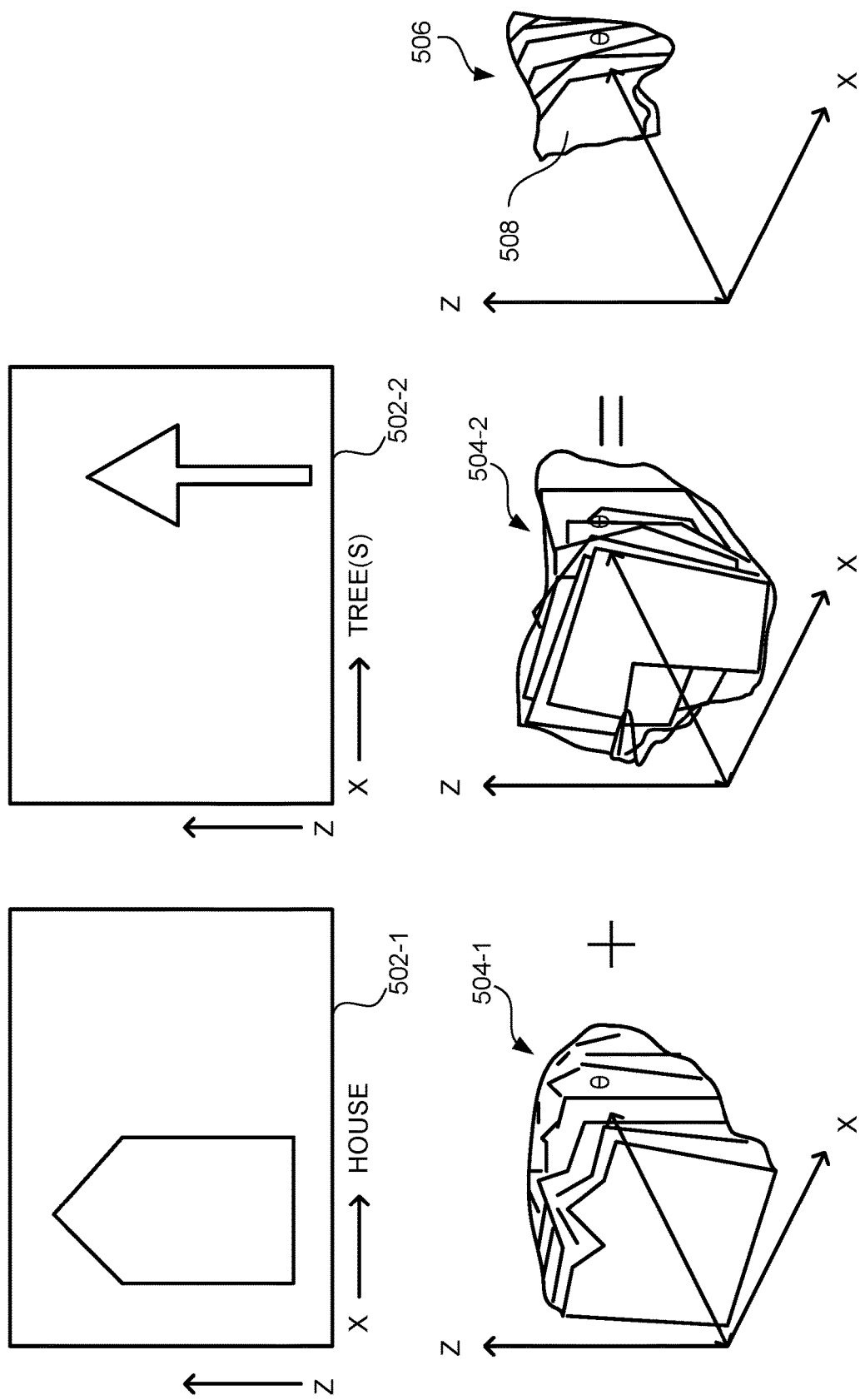
FIG. 5 is a schematic diagram of semantic layers, semantic layer configuration spaces generated from those semantic layers, and a resulting combined configuration space, in accordance with described implementations.

For ease of explanation, the following discussion with respect to FIGS. 4 through 5 will described in a 2D space with respect to X (horizontal direction of the aerial vehicle), Y (altitude of the aerial vehicle), and θ (the position/orientation of the aerial vehicle). For example, FIG. 4 is a schematic diagram of a 2D workspace 400, in accordance with described implementations. The workspace 400 is a simplified illustration of an aerial vehicle 405, an object of a house type 430-1 and an object of a tree type 430-2 in the X-Z coordinate plane. Rather than processing 3D point clouds and/or stereo images of the environment, semantic layers corresponding to the object types (house, tree) are determined, a semantic c-spaces obtained or generated for each, and a combined c-space determined by overlaying or combing each of the semantic c-spaces for the different object types.

For example, FIG. 5 is a schematic diagram of semantic layers 502-1, 502-2, semantic c-spaces 504-1, 504-2 generated from those semantic layers 502-1, 502-2, and a resulting combined c-space 506, in accordance with described implementations.

As described, utilizing the combined c-space 506 a common area and configuration is determined in which the aerial vehicle can operate without, in this example, colliding with the house 430-1 or the tree 430-2. For illustration purposes, referring briefly back to the workspace 400 (FIG. 4), there is certain aerial vehicle 405 configuration in which the aerial vehicle can navigate between the house 430-1 and the tree 430-2 without colliding into one or other. For example, if the aerial vehicle was oriented horizontally, it would collide with either the house 430-1 or the tree 430-2. In comparison, by configuring the aerial vehicle at the angle θ, the aerial vehicle can navigate between the house 430-1 and/or the tree 430-2 without colliding with either the house 430-1 or the tree 430-2.

This vehicle configuration can be determined by overlaying or combining the different semantic c-spaces for the house and the tree. For example, referring now to FIG. 5, the semantic layer 502-1 for the house, which, as discussed above, may be generated from a variety of sources (public, private, prior navigations, etc.) and in advance of navigation by the aerial vehicle into the environment, may be processed to generate a semantic c-space 504-1 for the house. In this example, the semantic c-space 504-1 for the house represents all configurations of X, Z, and θ that do not result in the aerial vehicle colliding with the house object, as represented in the semantic layer 502-1. In some implementations, one or more parameters, such as the size and/or shape of the aerial vehicle may be added to the size and shape of the object, in this example the house, and each point (X, Z, θ) may be processed to determine if the vehicle configuration at that point collides with the object, which may be represented as a "0" or does not collide with the object, which may be represented as a "1" in the semantic c-space. The results of the semantic c-space may be visually represented by the semantic c-space 504-1 for the house object.

Computation of each point of a semantic c-space may be performed in parallel to speed generation of the semantic c-space. Likewise, in some implementations, computations of portions of the semantic c-space for different degrees of freedom for a point may be likewise be computed in parallel and compared to determine if the aerial vehicle will collide with an object at that point. For example, one computing instance may determine whether x, y, and θx will result in the aerial vehicle colliding with an object of the semantic layer. Another computing instance may process x, θz, and θy in parallel to determine if the aerial vehicle will collide with an object at that point. This may be performed for each degree of freedom and the results combined to determine, for each point in the semantic c-space, whether the aerial vehicle will collide with an object at that point. While the above example illustrates parallel processing in which each computing instance considers three degrees of freedom, in other implementations, fewer or additional degrees of freedom may be considered by each computing instance when computing the semantic c-space from the semantic layer and considering the degrees of freedom of operation of the aerial vehicle. Likewise, in some implementations, fewer than all the degrees of freedom may be computed for an aerial vehicle in generating the semantic c-spaces. For example, even though an aerial vehicle may operate in six or more degrees of freedom, the first semantic configuration space is determined based on fewer degrees of operational freedom, configuration spaces may be computed based fewer than the six or more degrees for operational freedom. In some instances, the semantic c-spaces may be computed for three degrees of operational freedom (e.g., pitch, yaw, roll), regardless of the number of degrees of operational freedom of the vehicle.

Similar to the above, the semantic layer 502-2 for the object type tree may also be processed for every point (X, Z, θ) for the aerial vehicle to produce a semantic c-space 504-2 based on the tree semantic layer 502-2.

As discussed above, the semantic layers 502-1, 502-2 and/or the semantic c-spaces 504-1, 504-2 may be pre-computed in advance of any navigation by the aerial vehicle and the semantic layers and/or semantic c-spaces maintained in a data store.

When navigation through the environment is to be performed, object types within the environment, in this example the house and tree, are determined, the semantic c-space for each object type obtained from a data store or generated from the corresponding semantic layer, and overlaid or combined to generate a combined c-space 506. The combined c-space includes a common area 508 that is common to each combined semantic c-space as a valid area and configuration of the aerial vehicle in which the aerial vehicle can navigate without colliding into an object.

Utilizing the combined c-space 506, a navigation route between a source location and a destination location can be determined that is within the common area indicated by the combined c-space.

While the above example is discussed with respect to a 2D space, it will be appreciated, that the example implementations, and resulting combined c-space may be in any number of dimensions and the 2D example is provided for ease of explanation and illustration.

Figure 6:
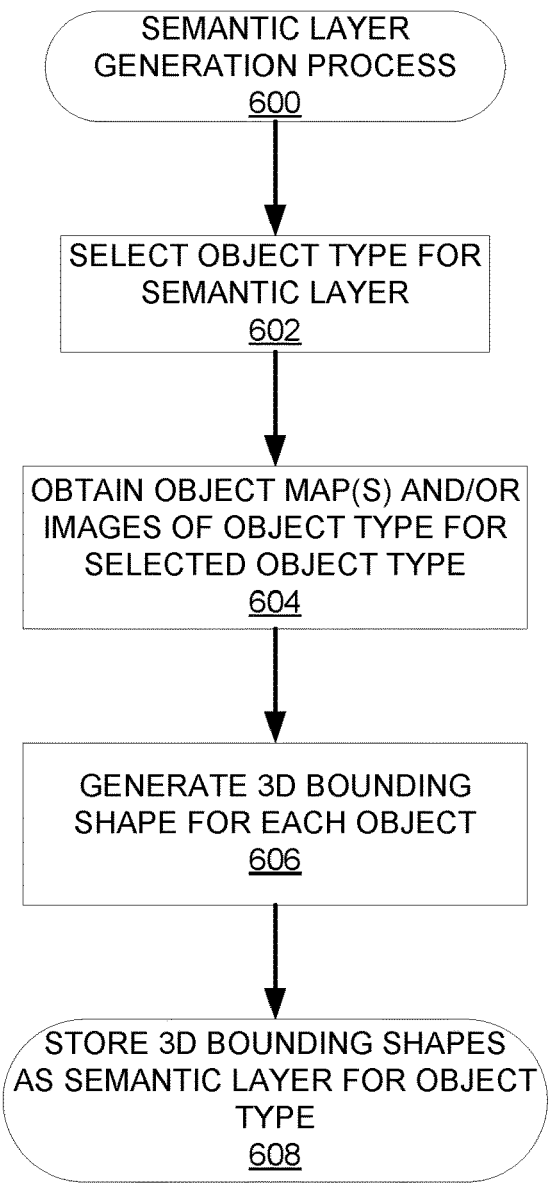
FIG. 6 is a flow diagram of an example semantic layer generation process, in accordance with described implementations.

FIG. 6 is a flow diagram of an example semantic layer generation process 600, in accordance with described implementations. The example process 600 may be performed for each object type for which a semantic layer is to be generated. Likewise, the example process 600 may be performed at any time and the results maintained in one or more data stores. In addition, the example process 600 may be periodically performed and/or performed on request to update one or more semantic layers.

The example process 600 begins by selecting an object type for which a semantic layer is to be generated, as in 602. As discussed above, the object type may be any type of physical or non-physical object. For example, the object type may be a structure, a tower, a bridge, a navigation barrier (e.g., no-fly zone), a maximum altitude, a minimum altitude, or anything else for which an aerial vehicle is to avoid navigation. The example process may be performed for any size of environment, including, but not limited to, a parcel, a neighborhood, a town, a city, a state, a country, etc.

For the selected object type, object maps, object images, and/or other information for the selected object type are obtained, as in 604. For example, as discussed above, object information (e.g., position, size, shape, etc.) for objects of the object type may be obtained from a variety of public and/or other sources. For example, topology maps, parcel maps, structure maps, FCC tower maps, satellite images, aerial imagery, etc., corresponding to objects of an object type may be obtained as part of the example process 600.

Based on the obtained object information for objects of the object type, 3D bounding shapes corresponding to each object of the object type are generated, as in 606. The 3D bounding shapes may be represented as a series of vectors or coordinates corresponding to the 3D bounding shapes.

Finally, the 3D bounding shapes for each of the objects of the object type are maintained as a semantic layer for the object type, as in 608. The semantic layer may be maintained in a data store that is accessible to one or more computing systems and/or the aerial vehicle.

Figure 7:
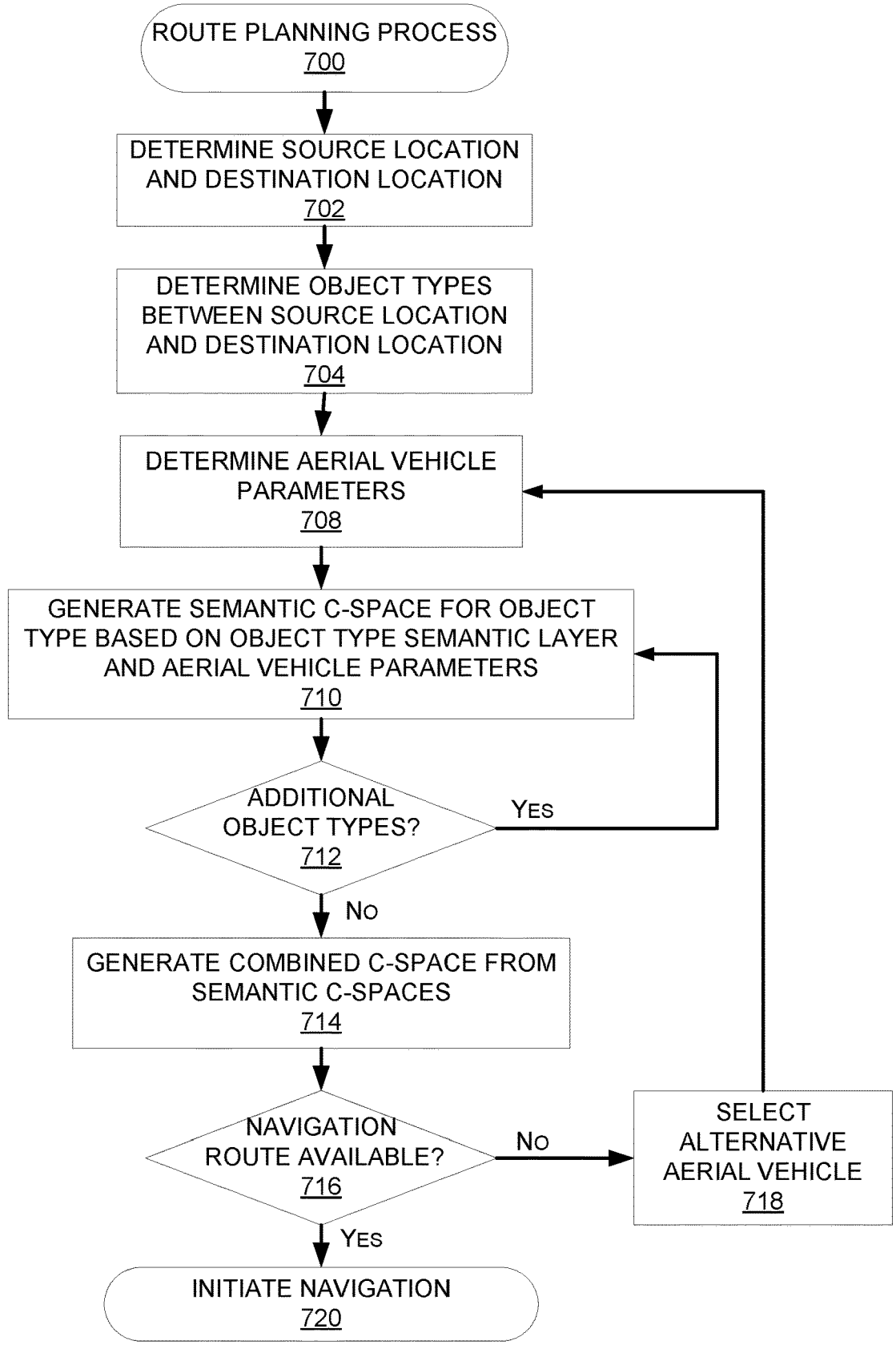
FIG. 7 is a flow diagram of an example route planning process, in accordance with described implementations.

FIG. 7 is a flow diagram of an example route planning process 700, in accordance with described implementations. Similar to the example process 600, the example process 700 may be performed in advance of any navigation into the environment and the results maintained in a data store and accessible to one or more computing systems and/or aerial vehicles. Likewise, the example process may be periodically performed. For example, each time a semantic layer for an object type is updated the example process 700 may be performed. In some implementations, a portion of the example process 700 may be performed in advance of any aerial navigation and another portion may be performed in real-time or near real-time at the beginning of or during aerial navigation.

The example process 700 begins by determining a source location and a destination location between which an aerial vehicle is to navigate, as in 702. In some implementations, the source location may be a current location of the aerial vehicle. In other implementations, the source location may be a location of an inventory item that is to be transported by the aerial vehicle to a destination location. For example, a user of an electronic commerce website may order an item for delivery to a specific delivery address (e.g., their home). In such an example, the source location may be a materials handling facility that stocks the ordered item and the destination location may be the user specified delivery address.

Based on the source location and the destination location, object types of objects anticipated or known to be between the source location and destination location are determined, as in 704. For example, an area around and between the source location and destination location may be considered to determine object types in that area. In other implementations, block 704 may be omitted and all semantic layers may be selected as potentially representative of an object type between the source location and the destination location.

In addition to determining object types, aerial vehicle parameters for an aerial vehicle or type of aerial vehicle that may navigate between the source location and the destination location are determined, as in 708. Aerial vehicle parameters may include a size, shape, and/or dimension of the aerial vehicle. In addition, the aerial vehicle parameters may specify one or more navigation constraints with respect to the aerial vehicle. For example, the navigation constraints may be a maximum pitch of the aerial vehicle, a minimum pitch of the aerial vehicle, a maximum yaw of the aerial vehicle, a minimum yaw of the aerial vehicle, a maximum roll of the aerial vehicle, or a minimum roll of the aerial vehicle, a maximum heave of the aerial vehicle, a minimum heave of the aerial vehicle, a maximum surge of the aerial vehicle, a minimum surge of the aerial vehicle, a maximum sway of the aerial vehicle, a minimum sway of the aerial vehicle, and/or any combination thereof.

Based on the aerial vehicle parameters and an object type semantic layer, the example process generates a semantic c-space for the object type, as in 710. As discussed above, the semantic c-space represents all valid configurations of the aerial vehicle in which the aerial vehicle does not collide with an object of the object type represented by the selected semantic c-space.

After generating the semantic c-space for the object type, a determination is made as to whether there are additional object types, as in 712. For example, if it was determined at block 704 that there are three different object types between the source location and the destination location, it will be determined at decision block 712 that additional object types exist until a semantic c-space has been generated for each of the three object types. As another example, if block 704 is omitted and all semantic layers are considered, it will be determined at decision block 712 that existing object types remain until a semantic c-space has been formed for each of the semantic layers.

If it is determined at decision block 712 that additional object types remain, the example process 700 returns to block 710 and generates a semantic c-space for a next object type. If it is determined at decision block 712 that no additional object types remain, the generated semantic c-spaces are overlaid or combined to form a combined c-space, as in 714. In some implementation, the example process 700 may complete upon determination that all semantic c-spaces for the different object types have been formed and those semantic c-spaces may be maintained in a data store for later use in generating a combined c-space, as in 714.

Regardless of whether the semantic c-spaces are combined upon generation or at a later point-in-time, the combined c-space represents a common area and configuration within the environment in which the aerial vehicle can operate without colliding into an object represented by one of the semantic layers. However, for the aerial vehicle to navigate from the source location to the destination location, the common area must continually exist between the source location and the destination location. Accordingly, a determination is made as to whether a common area exists through which a navigation route may be defined between the source location and the destination location, as in 716. If it is determined that a navigation route is not available between the source location and the destination location (i.e., there is no common area of the combined c-space that continues between the source location and the destination location, an alternative aerial vehicle is selected for the navigation, as in 718. The alternative aerial vehicle may have different aerial vehicle parameters, such as smaller dimensions, less navigation constraints, etc., that may result in a common area that is continuous between the source location and the destination location.

Upon selection of an alternative aerial vehicle, the example process 700 returns to block 708 and continues. In some implementations, the example process 700 may continue selecting alternate aerial vehicle until all potential aerial vehicles have been considered or until a continuous common area between the source location and destination location has been determined. If all aerial vehicles are processed and a continuous common area between the source location and the destination location cannot be determined, the example process 700 may terminate with an indication that aerial vehicle delivery of the item from the source location to the destination location is not available.

Returning to decision block 716, if it is determined that a navigation route is available, the example process 700 may cause the aerial vehicle to being navigation along the aerial navigation route, as in 720.

Figure 8:
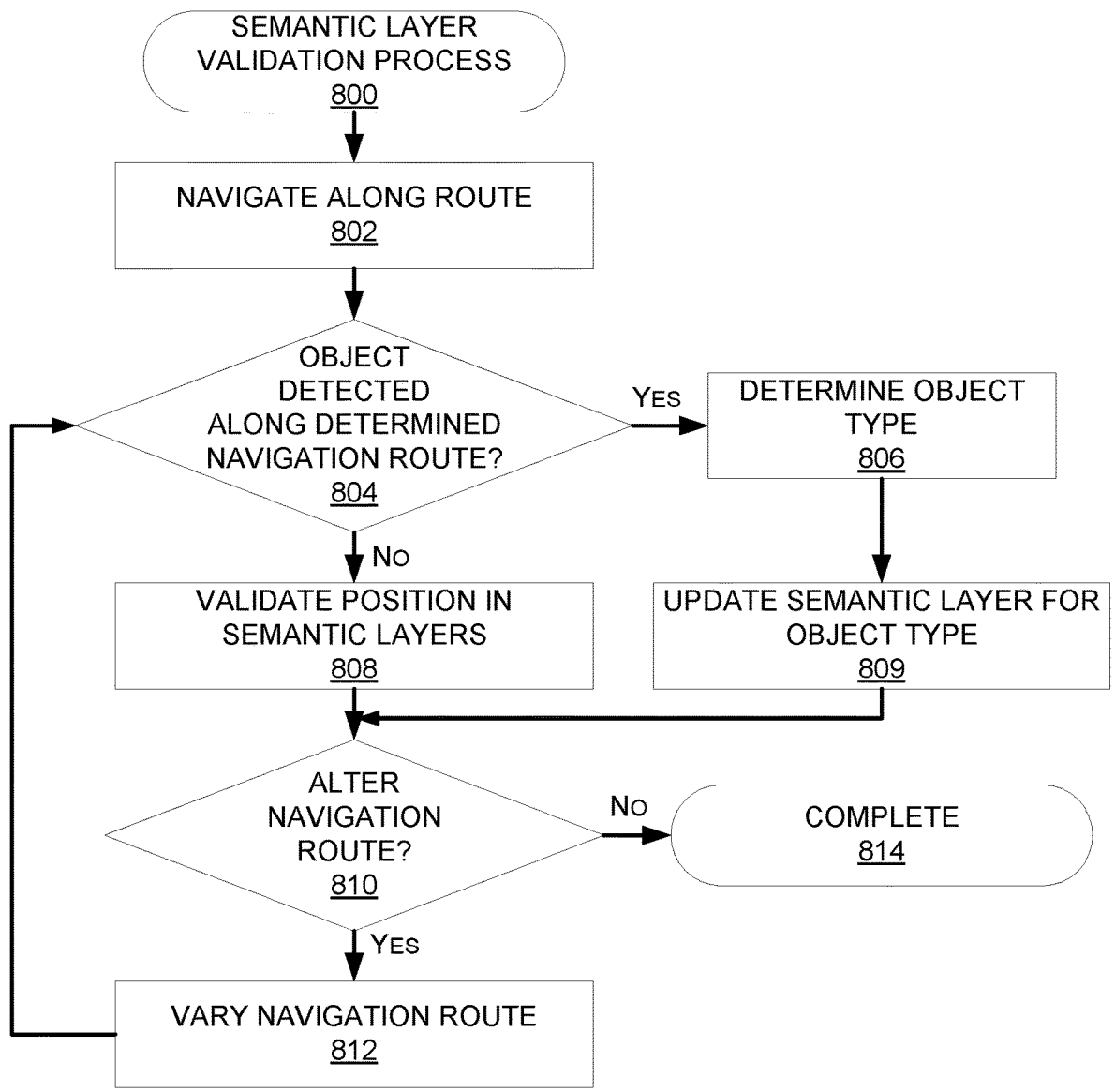
FIG. 8 is a flow diagram of an example semantic layer validation process, in accordance with described implementations.

FIG. 8 is a flow diagram of an example semantic layer validation process 800, in accordance with described implementations. The example process 800 occurs during route navigation between a source location and a destination location, as in 802. As discussed above, a navigation route may be determined from within a continuous common area defined by a combined c-space between a source location and a destination location. As such, if an object is detected along the navigation route, one or more of the semantic layers and corresponding semantic c-spaces need to be updated to indicate the object. In comparison, if no objects are detected, the points along the route may be verified in each of the semantic layers and/or corresponding semantic c-spaces as not corresponding to an object.

During route navigation, sensor data is collected by one or more sensors of the aerial vehicle and processed by the computing system of the aerial vehicle and/or by one or more remote computing systems, to determine if one or more objects are detected along the navigation route, as in 804. If it is determined that an object is detected along the navigation route, the aerial vehicle may automatically alter course to avoid the object. In addition, further processing of the sensor data may be performed to determine an object type of the detected object, as in 806.

Based on the determined object type, a semantic layer for the object type is updated to reflect the detected object type at the detected position, as in 809. For example, a 3D bounding shape may be generated based on sensor data collected by the aerial vehicle and corresponding to the object. That 3D bounding shape may then be added to the semantic layer that corresponds to the object type for the determined object. In some implementations, the detected object may be an unstructured object for which a semantic layer may not be maintained. An unstructured object may be, for example, a bird or other animal, another aerial vehicle, etc.

However, if it is determined at decision block 804 that no object is encountered along the portion of the navigation route, the position in the semantic layers and/or the configuration in the semantic c-spaces are validated as correctly indicating that no object exits at those positions and/or configurations, as in 808.

After either validating the semantic layers and/or semantic c-spaces, as in 808, and/or updating a semantic layer, as in block 809, a determine may be made as to whether the aerial vehicle is to alter course from the navigation route and navigate through an area adjacent the navigation route, as in 810. Alteration of the navigation route may be performed periodically to obtain sensor data for other areas adjacent the navigation route. The obtained sensor data may then be processed to determine the presence or absence of objects in those other areas. Based on the determined presence or absence of objects in those other areas, semantic layers and/or semantic c-spaces may be updated and/or validated accordingly for those other areas and/or object types that are detected or not detected in those areas.

Accordingly, if it is determined that the navigation route is to be altered, the navigation route is varied, as in 812, and the example process 800 returns to decision block 804 and continues. If it is determined that the navigation route is not to be altered and/or upon completion of the navigation route, the example process 800 completes, as in 814.

Figure 9:
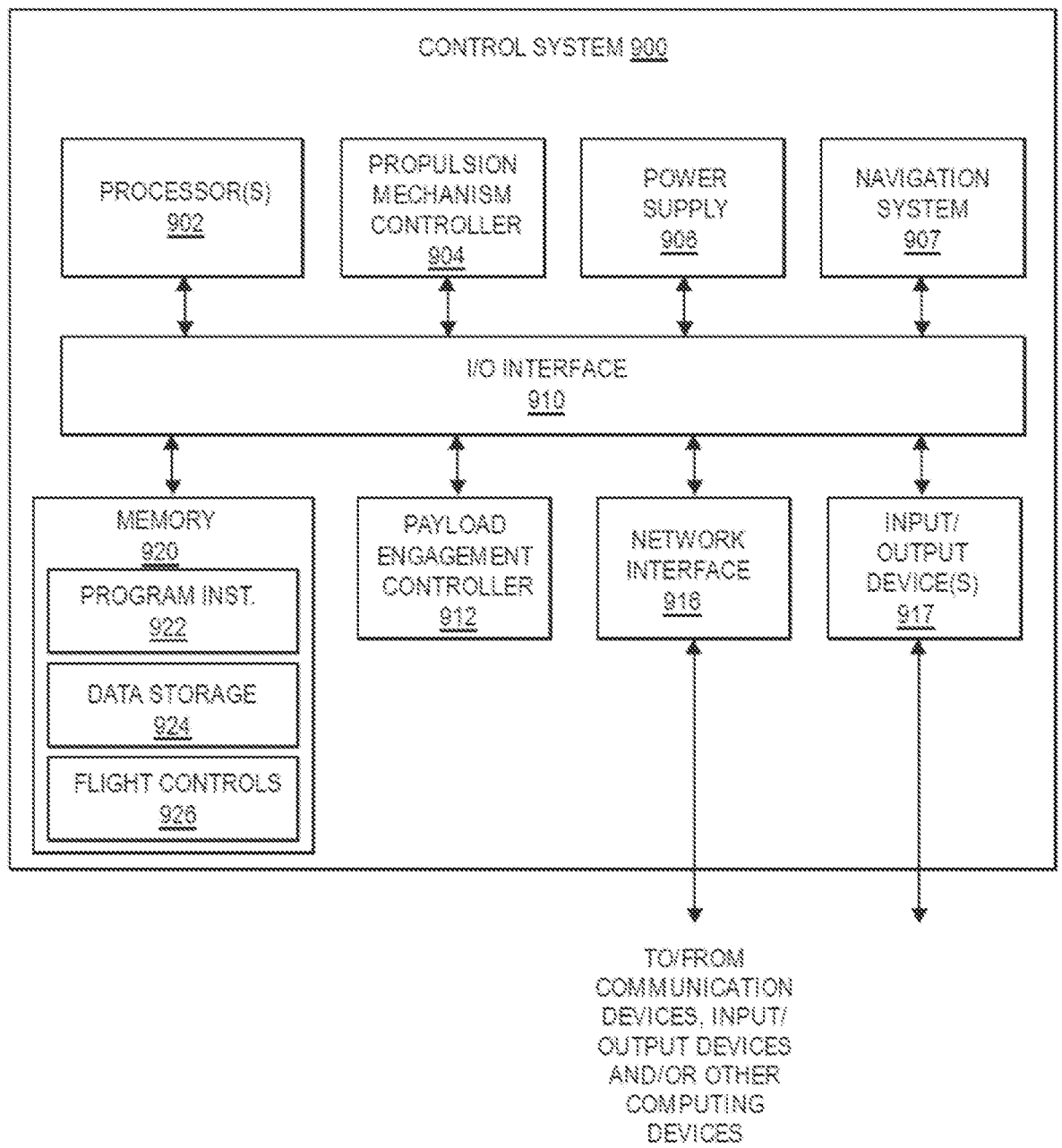
FIG. 9 is an example aerial vehicle control system, in accordance with described implementations.

FIG. 9 is a block diagram illustrating various components of an example aerial vehicle control system 900, in accordance with disclosed implementations.

In various examples, the block diagram may be illustrative of one or more aspects of the aerial vehicle control system 900 that may be used to implement the various systems and methods discussed herein and/or to control operation of an aerial vehicle discussed herein. In the illustrated implementation, the aerial vehicle control system 900 includes one or more processors 902, coupled to a memory, e.g., a non-transitory computer readable storage medium 920, via an input/output (I/O) interface 910. The aerial vehicle control system 900 also includes propulsion mechanism controllers 904, such as electronic speed controls (ESCs) or motor controllers, power modules 906 and/or a navigation system 907. The aerial vehicle control system 900 further includes a payload engagement controller 912, a network interface 916, and one or more input/output devices 917.

In various implementations, the aerial vehicle control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, navigation routes, flight control parameters, semantic layers, semantic c-spaces, combined c-spaces, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and flight controls 926, respectively. In other implementations, program instructions, data, and/or flight controls may be received, sent, or stored upon different types of computer-accessible media, such as non-transitory media, or on similar media separate from the non-transitory computer readable storage medium 920 or the aerial vehicle control system 900. Generally speaking, a non-transitory, computer readable storage medium may include storage media or memory media such as magnetic or optical media, e.g., disk or CD/DVD-ROM, coupled to the aerial vehicle control system 900 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 917. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The propulsion mechanism controllers 904 may communicate with the navigation system 907 and adjust the rotational speed, position, orientation, or other parameters of each propulsion mechanism, to stabilize the aerial vehicle, and/or to perform one or more maneuvers and guide the aerial vehicle along a navigation route and/or to a safe landing location.

The navigation system 907 may include a global positioning system (GPS), indoor positioning system (IPS), or other similar system and/or sensors that can be used to navigate the aerial vehicle to and/or from a location. The payload engagement controller 912 communicates with the actuator(s) or motor(s) (e.g., a servo motor) used to engage and/or disengage items.

The network interface 916 may be configured to allow data to be exchanged between the aerial vehicle control system 900, other devices attached to a network, such as other computer systems (e.g., remote computing resources), and/or with aerial vehicle control systems of other aerial vehicles. For example, the network interface 916 may enable wireless communication between the aerial vehicle and an aerial vehicle control system that is implemented on one or more remote computing resources. For wireless communication, an antenna of the aerial vehicle or other communication components may be utilized. As another example, the network interface 916 may enable wireless communication between numerous aerial vehicles. In various implementations, the network interface 916 may support communication via wireless general data networks, such as a Wi-Fi network. For example, the network interface 916 may support communication via telecommunications networks, such as cellular communication networks, satellite networks, and the like.

Input/output devices 917 may, in some implementations, include one or more displays, imaging devices, thermal sensors, infrared sensors, time of flight sensors, accelerometers, pressure sensors, weather sensors, etc. Multiple input/output devices 917 may be present and controlled by the aerial vehicle control system 900. One or more of these sensors may be utilized to implement the implementations described.

As shown in FIG. 9, the memory may include program instructions 922, which may be configured to implement the example routines and/or sub-routines described herein. The data storage 924 may include various data stores for maintaining data items that may be provided for aerial vehicle navigation, determining navigation routes, landing, detecting objects or object types, generating semantic layers, generating semantic c-spaces, generating combined c-spaces, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 900 is merely illustrative and is not intended to limit the scope of the present disclosure. In particular, the computing system and devices may include any combination of hardware or software that can perform the indicated functions. The aerial vehicle control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 900. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 900 may be transmitted to the aerial vehicle control system 900 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 10:
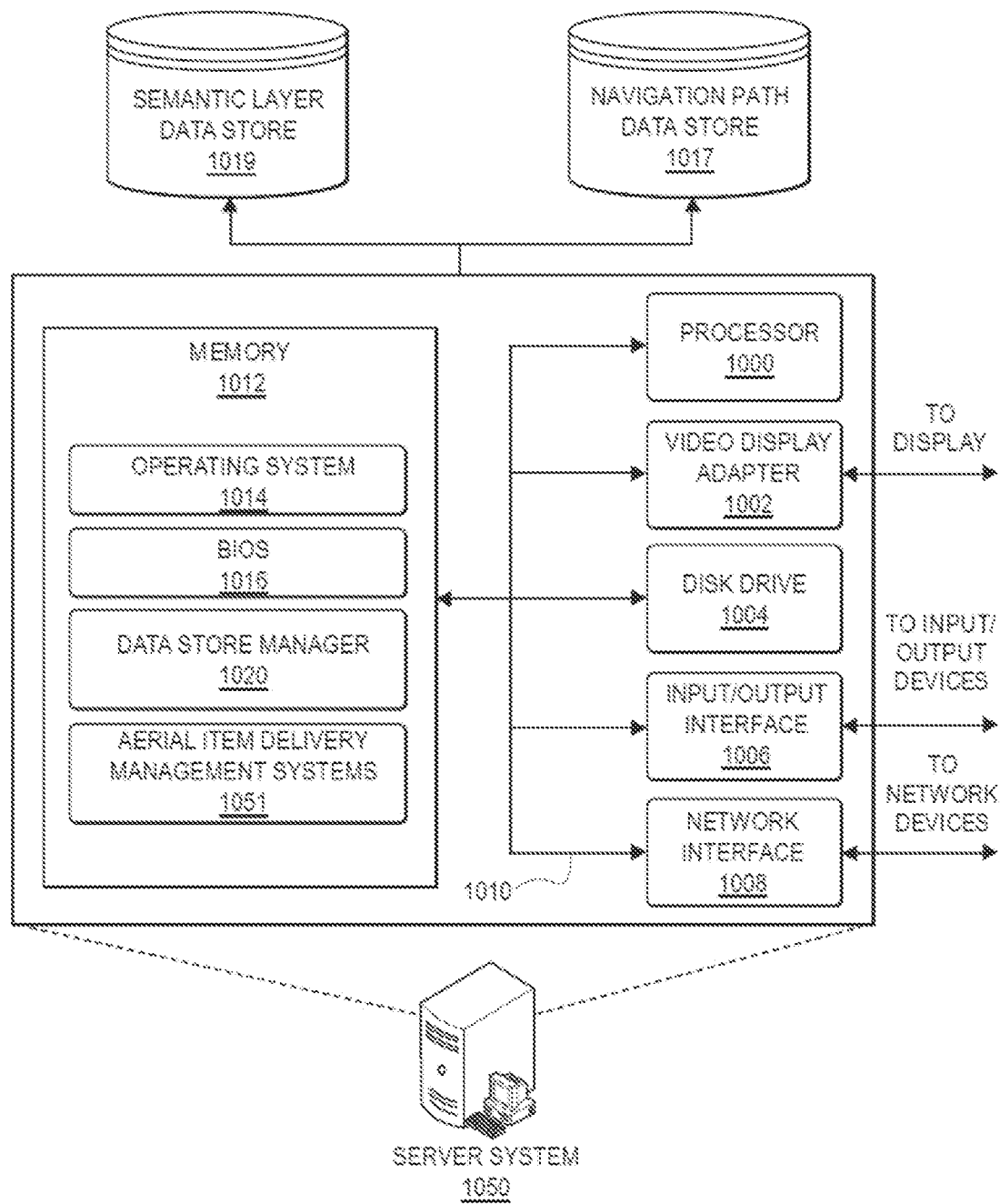
FIG. 10 is an example computing system, in accordance with disclosed implementations.

FIG. 10 is a pictorial diagram of an illustrative implementation of a server system 1050 that may be used in the implementations described herein.

The server system 1050 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display permitting an operator of the server system 1050 to monitor and configure operation of the server system 1050. The input/output interface 1006 likewise communicates with external input/output devices, such as a mouse, keyboard, scanner, or other input and output devices that can be operated by an operator of the server system 1050. The network interface 1008 includes hardware, software, or any combination thereof, to communicate with other computing devices. For example, the network interface 1008 may be configured to provide communications between the server system 1050 and other computing devices, such as the aerial vehicle control system 900 (FIG. 9) of an aerial vehicle 305 (FIG. 3).

The memory 1012 may be a non-transitory computer readable storage medium configured to store executable instructions accessible by the processor(s) 1000. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1008.

The memory 1012 is shown storing an operating system 1014 for controlling the operation of the server system 1050. A binary input/output system (BIOS) 1016 for controlling the low-level operation of the server system 1050 is also stored in the memory 1012. The memory 1012 additionally stores computer executable instructions, that, when executed by the processor 1000 cause the processor to perform one or more of the processes discussed herein. The memory 1012 additionally stores program code and data for providing network services. The data store manager application 1020 facilitates data exchange between the data stores 1017, 1019 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 1050 can include any appropriate hardware and software for integrating with the data stores 1017, 1019 as needed to execute aspects of the management systems 1050.

The data stores 1017, 1019 can include several separate data tables, databases or other data storage mechanisms and media for storing data relating to a particular aspect. For example, the data stores 1017, 1019 illustrated include mechanisms for maintaining navigation route information, semantic layers, semantic c-spaces, etc. Depending on the configuration and use of the server system 1050, one or more of the data stores may not be included or accessible to the server system 1050 and/or other data store may be included or accessible.

It should be understood that there can be many other aspects that may be stored in the data stores 1017, 1019. The data stores 1017, 1019 are operable, through logic associated therewith, to receive instructions from the server system 1050 and obtain, update or otherwise process data in response thereto.

The memory 1012 may also include an aerial item delivery management system 1051. The item delivery management system 1051 may be configured to perform some or all of the implementations discussed herein and/or to exchange data and information with one or more aerial vehicles. For example, the item delivery management system 1051 may perform one or more of the processes discussed above with respect to FIGS. 6 through 8.

The corresponding server system 1050 may be executable by the processor 1000 to implement one or more of the functions of the server system 1050. In one implementation, the server system 1050 may represent instructions embodied in one or more software programs stored in the memory 1012. In another implementation, the system 1050 can represent hardware, software instructions, or a combination thereof.

The server system 1050, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 6 through 8, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine an aerial navigation route between a source location and a destination location, comprising:
    determining a plurality of object types of objects that exist between the source location and the destination location;
    obtaining, for each of the plurality of object types, a semantic layer corresponding to the object type, wherein each semantic layer represents each object of the object type as a three-dimensional bounding shape at a geographic position of the object between the source location and the destination location;
    determining an aerial vehicle that will navigate the aerial navigation route between the source location and the destination location;
    for each of the plurality of semantic layers and based at least in part on a parameter of the aerial vehicle, generating a semantic configuration space, wherein the semantic configuration space for the semantic layer indicates all valid configurations of the aerial vehicle, determined based at least in part on the parameter of the aerial vehicle, in which the aerial vehicle does not collide with one or more of the objects of the object type corresponding to the semantic layer;
    combining each of the semantic configuration spaces generated for the plurality of semantic layers to produce a combined configuration space, wherein the combined configuration space indicates a common area between the source location and the destination location in which the aerial vehicle can navigate without colliding with an object of one of the plurality of object types;
    determining, for the aerial vehicle, the aerial navigation route from the source location and the destination location that is within the common area; and
    causing the aerial vehicle to initiate navigation from the source location toward the destination location and along the aerial navigation route.

2. The computer-implemented method of claim 1, wherein:
    the aerial vehicle has at least six-degrees of operational freedom; and
    each semantic configuration space indicates for each configuration of the aerial vehicle between the source location and the destination location whether the aerial vehicle will collide with an object of the object type represented by the semantic layer in that configuration.

3. The computer-implemented method of claim 1, wherein parameter of the aerial vehicle indicates one or more of a maximum pitch of the aerial vehicle, a minimum pitch of the aerial vehicle, a maximum yaw of the aerial vehicle, a minimum yaw of the aerial vehicle, a maximum roll of the aerial vehicle, a minimum roll of the aerial vehicle, a maximum heave of the aerial vehicle, a minimum heave of the aerial vehicle, a maximum sway of the aerial vehicle, a minimum sway of the aerial vehicle, a maximum surge of the aerial vehicle, or a minimum surge of the aerial vehicle.

4. The computer-implemented method of claim 1, further comprising:
    detecting, during aerial navigation of the aerial vehicle, an object at a position along the aerial navigation route;
    altering aerial navigation of the aerial vehicle to avoid the object;
    determining an object type of the object; and
    updating a semantic map corresponding to the object type of the object to indicate the object at the position.

5. The computer-implemented method of claim 1, further comprising:
    completing aerial navigation along a portion of the aerial navigation route without detecting an object along the portion of the aerial navigation route; and
    in response to completing the portion of the aerial navigation route without detecting an object, validating, in each of the plurality of semantic layers, aerial vehicle configurations corresponding to the completed portions of the aerial navigation route.

6. A method, comprising:
    determining a source location and destination location;
    determining a first semantic configuration space corresponding to a first object type of a first object that exists between the source location and the destination location, wherein the first semantic configuration space indicates configurations of an aerial vehicle that do not collide with one or more objects of the first object type between the source location and the destination location;
    determining a second semantic configuration space corresponding to a second object type of a second object that exists between the source location and the destination location, wherein the second semantic configuration space indicates configurations of the aerial vehicle that do not collide with one or more objects of the second object type between the source location and the destination location;

combining the first semantic configuration space and the second semantic configuration space to produce a combined configuration space, wherein the combined configuration space indicates a common area between the source location and the destination location in which the aerial vehicle can navigate without colliding with objects of the first object type or objects of the second object type;

determining, for the aerial vehicle, a navigation route from the source location and the destination location that is within the common area; and causing the aerial vehicle to initiate navigation from the source location toward the destination location and along the navigation route.

7. The method of claim 6, further comprising:
obtaining a first semantic layer corresponding to the first object type, wherein the first semantic layer represents each object of the first object type as a three-dimensional bounding shape at a geographic position of the object between the source location and the destination location; and wherein determining the first semantic configuration space, further includes:
generating, based at least in part on the first semantic layer for the first object type, the first semantic configuration space for the first object type.

8. The method of claim 7, further comprising:
causing, during navigation along the navigation route, the aerial vehicle to alter a course of navigation and navigate through an area adjacent the navigation route;
detecting, with at least one sensor of the aerial vehicle and while the aerial vehicle is navigating through the area adjacent the navigation route, an object of the first object type; and
updating the first semantic layer to indicate at least one of a position, a size, or a shape of the object detected by the at least one sensor of the aerial vehicle.

9. The method of claim 7, wherein:
the aerial vehicle has at least six-degrees of operational freedom; and
the first semantic configuration space is determined based on fewer degrees of operational freedom than the at least six-degrees of operational freedom.

10. The method of claim 6, wherein:
the aerial vehicle has at least six-degrees of operational freedom; and
the first semantic configuration space indicates for each configuration of the aerial vehicle between the source location and the destination location whether the aerial vehicle will collide with an object of the first object type represented by the first semantic layer.

11. The method of claim 6, further comprising:
determining a change to at least one object of the first object type between the source location and the destination location;
in response to determining the change, determining an updated first semantic configuration space of the first object type; and
combining the updated first semantic configuration space with the second semantic configuration space to produce a combined updated configuration space.

12. The method of claim 6, wherein the first object type is at least one of a physical object that exists between the source location and the destination location, a navigation barrier between the source location and the destination location through which the aerial vehicle is prohibited from navigating, a maximum altitude above which the aerial vehicle is not to navigate, or a minimum altitude below with the aerial vehicle is not to navigate during a transit flight between the source location and the destination location.

13. The method of claim 6, wherein the first semantic configuration space is generated prior to determining a source location and a destination location and maintained in a data store.

14. The method of claim 6, wherein the first semantic configuration space is determined based at least in part on one or more parameters of the aerial vehicle.

15. The method of claim 6, further comprising:
completing aerial navigation along a portion of the navigation route without detecting an object along the portion of the navigation route; and
in response to completing the portion of the navigation route without detecting an object, validating, in each of the first semantic layer and the second semantic layer, aerial vehicle configurations corresponding to the completed portions of the aerial navigation route.

16. A system, comprising:
one or more processors; and
a memory storing program instructions that when executed by the one or more processors cause the one or more processors to at least:
maintain in a data store a first semantic layer, wherein the first semantic layer represents each object of a first object type as a three-dimensional bounding shape at a geographic position of the object;
maintain in the data store a second semantic layer, wherein the first semantic layer represents each object of a second object type as a three-dimensional bounding shape at a geographic position of the object;
generate based at least in part on vehicle parameters of a vehicle and the first semantic layer, a first semantic configuration space, wherein the first semantic configuration space indicates all valid configurations of the vehicle, determined based at least in part on the vehicle parameters, in which the vehicle does not collide with one or more objects of the first object type;
generate, based at least in part on the vehicle parameters and the second semantic layer, a second semantic configuration space, wherein the second semantic configuration space indicates all valid configurations of the vehicle, determined based at least in part on the vehicle parameters, in which the vehicle does not collide with one or more objects of the second object type;
determine a source location and a destination location;
generate a combined configuration space for an area between the source location and the destination location based at least in part on a combination of at least a portion of the first semantic configuration space and at least a portion of the second semantic configuration space, wherein the combined configuration space indicates a common area between the source location and the destination location in which the vehicle can navigate without colliding with an object of first object type or an object of the second object type; and
provide, to the vehicle, an indication of the common area such that the vehicle can navigate between the source location and the destination location in accordance with the common area.

17. The system of claim 16, wherein the common area indicates configurations of the vehicle between the source location and the destination location at which the vehicle will not collide with an object of the first object type or an object of the second object type.

18. The system of claim 16, wherein the vehicle is at least one of an aerial vehicle, an unmanned aerial vehicle, a ground based vehicle, an unmanned ground based vehicle, a water based vehicle, an unmanned water based vehicle, an amphibious vehicle, or an unmanned amphibious vehicle.

19. The system of claim 16, wherein the program instructions that when executed by the one or more processors further cause the one or more processors to at least:
  receive, from the vehicle an indication that the vehicle has navigated a portion of a navigation route within the common area between the source location and the destination location without detecting an object of the first object type or an object of the second object type;
  validate a portion of the first semantic layer corresponding to the portion of the navigation route to confirm that an object of the first object type is not present along that portion of the first semantic layer; and
  validate a portion of the second semantic layer corresponding to the portion of the navigation route to confirm that an object of the second object type is not present along that portion of the second semantic layer.

20. The system of claim 16, wherein the program instructions when executed by the one or more processors further cause the one or more processors to at least:
  receive, from the vehicle, an indication that the vehicle has navigated a portion of a navigation route within the common area between the source location and the destination location and detected an object of the first object type;
  update a portion of the first semantic layer corresponding to the portion of the navigation route to indicate that an object of the first object type is present along that portion of the first semantic layer to generate an updated first semantic layer; and
  generate based at least in part on the vehicle parameters and the updated first semantic layer, an updated first semantic configuration space, wherein the updated first semantic configuration space indicates all valid configurations of the vehicle, determined based at least in part on the vehicle parameters, in which the vehicle does not collide with one or more objects of the first object type, as indicated by the updated first semantic layer.

* * * * *

UNITED STATES PATENT AND TRADEMARK OFFICE
CERTIFICATE OF CORRECTION

PATENT NO. : 11,216,014 B1  
APPLICATION NO. : 16/528922  
DATED : January 4, 2022  
INVENTOR(S) : Mishra et al.

Page 1 of 1

It is certified that error appears in the above-identified patent and that said Letters Patent is hereby corrected as shown below:

In the Claims

Column 20:
Line 1, Claim 12, "vehicle is not to navigate, or a minimum altitude below with" should read as
--vehicle is not to navigate, or a minimum altitude below which--.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*